(12) United States Patent
Belfy et al.

(10) Patent No.: US 11,661,207 B2
(45) Date of Patent: May 30, 2023

(54) AVIONICS DEVICE FOR THE CENTRALIZED COMPUTATION AND DIFFUSION OF THE STATE(S) OF AN AIRCRAFT, RELATED AVIONICS ASSEMBLY, METHOD AND COMPUTER PROGRAM

(71) Applicant: THALES, Courbevoie (FR)

(72) Inventors: Henri Belfy, Toulouse (FR); Laurent Flotte, Toulouse (FR); Frédéric Marot, Toulouse (FR)

(73) Assignee: THALES, Courbevoie (FR)

( * ) Notice: Subject to any disclaimer, the term of this patent is extended or adjusted under 35 U.S.C. 154(b) by 292 days.

(21) Appl. No.: 17/159,808

(22) Filed: Jan. 27, 2021

(65) Prior Publication Data
US 2021/0237895 A1 Aug. 5, 2021

(30) Foreign Application Priority Data

Jan. 31, 2020 (FR) ...................... 20 00965

(51) Int. Cl.
*B64D 45/00* (2006.01)
*B64C 19/00* (2006.01)
(Continued)

(52) U.S. Cl.
CPC .............. *B64D 45/00* (2013.01); *B64C 19/00* (2013.01); *B64C 39/024* (2013.01);
(Continued)

(58) Field of Classification Search
CPC ............ B64D 45/00; B64D 2045/0085; B64C 19/00; B64C 39/024; G07C 5/0816; H04L 69/08; H04L 67/12; G05B 19/0423
See application file for complete search history.

(56) References Cited

U.S. PATENT DOCUMENTS 10,093,408 B1 * 10/2018 Smith ..................... B64C 25/22
10,964,130 B1 * 3/2021 Dixit .................. G05B 23/0283
(Continued)

FOREIGN PATENT DOCUMENTS

FR   3 014 575 A1   6/2015
FR   3 073 966 A1   5/2019
(Continued)

OTHER PUBLICATIONS

French Search Report, from the French Patent Office in counterpart French Application No. 2000965, dated Dec. 9, 2020.

*Primary Examiner* — Mussa A Shaawat
(74) *Attorney, Agent, or Firm* — ArentFox Schiff LLP

(57) ABSTRACT

The invention relates to an electronic device for the centralized computation and diffusion of the state(s) of an aircraft, configured for at least calculate the value of one or more aircraft state(s), generate a list of aircraft state(s) the value of which is accessible via the electronic device, the list comprising, for each state, information representative of the said state, diffuse the list to each consumer avionics device, of at least one value of at least one state, receive, from at least one consumer avionics device, at least one request for transmission of one or more values of at least one first state selected from the list, the request comprising the said representative information related to the said at least one first selected state, and transmit, to at least one consumer avionics device, only the value or values of the at least one selected state.

10 Claims, 5 Drawing Sheets

(51) Int. Cl.
*B64C 39/02* (2023.01)
*G07C 5/08* (2006.01)

(52) U.S. Cl.
CPC .... *G07C 5/0816* (2013.01); *B64D 2045/0085* (2013.01); *B64U 2201/00* (2023.01)

(56) References Cited

U.S. PATENT DOCUMENTS

| | | | | |
|---|---|---|---|---|
| 2005/0156777 | A1* | 7/2005 | King | G08G 5/0021 342/29 |
| 2009/0143925 | A1* | 6/2009 | Lavretsky | G05D 1/0825 701/1 |
| 2013/0314257 | A1* | 11/2013 | Macrae | G08C 17/00 340/971 |
| 2013/0317733 | A1* | 11/2013 | del Pozo de Poza | G08G 5/0082 701/301 |
| 2015/0217856 | A1* | 8/2015 | Mesguen | B64C 19/00 701/3 |
| 2015/0253779 | A1* | 9/2015 | Navarro | B64C 39/024 701/14 |
| 2016/0016655 | A1* | 1/2016 | Yeh | B64C 13/503 701/3 |
| 2016/0194074 | A1* | 7/2016 | Hagerott | B64C 13/16 701/5 |
| 2016/0202701 | A1* | 7/2016 | Burte | B64C 13/505 701/3 |
| 2016/0216849 | A1* | 7/2016 | Kawalkar | G06F 11/30 |
| 2018/0155052 | A1* | 6/2018 | Lacroix | G08G 5/0082 |
| 2018/0281990 | A1* | 10/2018 | Fagan | H04L 67/75 |
| 2019/0362638 | A1* | 11/2019 | Donhoffner | G08G 5/0047 |
| 2020/0090525 | A1* | 3/2020 | Krishnamoorthy | G06Q 50/30 |
| 2020/0092052 | A1* | 3/2020 | MacAfee | H04L 12/40045 |
| 2021/0160781 | A1* | 5/2021 | Dondoneau | H04W 36/32 |
| 2021/0304620 | A1* | 9/2021 | Selvarajan | G08G 5/003 |

FOREIGN PATENT DOCUMENTS

FR 3 074 007 B1 10/2019
FR 3 073 966 B1 11/2019

* cited by examiner

AVIONICS DEVICE FOR THE CENTRALIZED COMPUTATION AND DIFFUSION OF THE STATE(S) OF AN AIRCRAFT, RELATED AVIONICS ASSEMBLY, METHOD AND COMPUTER PROGRAM

CROSS-REFERENCE TO RELATED APPLICATIONS

This application claims priority to French Application No. 20 00965, filed on Jan. 31, 2020. The disclosure of the priority application is incorporated in its entirety herein by reference.

The present invention relates to an electronic device for the centralized computation and diffusion of the state(s) of an aircraft.

The present invention also relates to an avionics assembly comprising at least two pieces of electronic equipment linked together by an avionics network and/or via a direct link.

The present invention also relates to a method for the centralized computation and diffusion of the state(s) of an aircraft, the centralized computation and diffusion method being implemented by such an electronic device for the centralized computation and diffusion of the state(s) of an aircraft.

The present invention relates also to a computer program comprising software instructions which, wherein executed by a computer, implement such a method for the centralized computation and diffusion of the state(s) of an aircraft.

The present invention relates to the management of avionics systems of piloted or remotely operated aircraft. In today's aircraft (aircraft means airplanes, helicopters but also drones (UAVs), it is necessary for many avionics systems to determine one or more aircraft states.

Subsequently, aircraft state(s) refers to the state of avionics equipment (for example, engines, actuators, hydraulics) or aircraft capabilities (for example, possible types of approach, phase of flight).

Avionic systems wherein it is necessary to determine one or more aircraft states in particular, avionics systems configured to perform at least one avionics function, such as a Flight Management System (FMS), Flight Warning System (FWS), maintenance systems capable of configuring an on-board diagnostic avionics system according to the failure(s) detected, in particular on the basis of one or more aircraft states, and synoptic systems capable of displaying synoptic diagrams/pages of avionics equipment to show, for example, the avionics equipment dedicated to fuel, electrical and hydraulic distribution or the aircraft's capacities in terms of trajectories, approaches, etc.

Conventionally, each of the aforementioned avionics systems implements, independently of the other aforementioned avionics systems, its own internal computation of the aircraft state(s) it requires, however the structure of the exchange interface between on the one hand the internal tool for calculating the aircraft state(s) of the avionics system considered among the aforementioned avionics systems and on the other hand the internal functional user tool of the aircraft state(s) is predefined and fixed, which makes the evolution of the avionics system considered complex.

As an alternative, there is a centralized architecture wherein all the aircraft states required by the above-mentioned functional avionics systems are calculated by one or more aircraft state computation tools independent of the above-mentioned avionics systems, then all transmitted directly to the avionics systems using an exchange interface between the independent aircraft state computation tool(s) on the one hand and the above-mentioned avionics systems on the other hand. However, the structure of such a centralized architecture exchange interface is also fixed, which makes the above-mentioned avionics systems and the independent aircraft state computation tool(s) independent. Such interdependence is problematic when at least two distinct avionics systems from the above-mentioned avionics systems only require in common a part of the set of aircraft states transmitted on the exchange interface. Indeed, in the event of the addition of an aircraft state whose computation is required by one of these two avionics systems and not by the other, the other is potentially impacted by the change, in size or in order of transmission of the aircraft states, of the related exchange interface structure.

The object of the invention is then to propose an electronic device and a related method that makes it possible to improve the flexibility of the computation and diffusion of aircraft state(s) required by one or several functional avionics systems.

For this purpose, the object of the invention is an electronic device for the centralized computation and diffusion of the state(s) of an aircraft, the electronic device for centralized computation and diffusion is configured for at least:
  calculate the value of one or more distinct aircraft state(s),
  generate a list of aircraft state(s) whose value is suitable to be accessible via the electronic device for the centralized computation and diffusion, the list comprising, for each aircraft state(s), at least one item of information representative of the said aircraft state,
  diffuse the list to each consumer avionics device of at least one value of at least one state of said aircraft, a consumer avionics device being connected to the electronic device for the centralized computation and diffusion via an avionics network and/or via a direct link,
  receive, from at least one consumer avionics device, at least one request for transmission of one or more values of at least one first aircraft state selected from the list, the request comprising the said at least one representative item of information related to the said at least one first selected aircraft state,
  transmit, to the said at least one consumer avionics device, only the value or values of the said at least one selected aircraft state.

The electronic device for the centralized computation and diffusion of the state(s) of an aircraft is then capable of independently centralizing the computation of the value of the aircraft states required by consumer functional avionics devices to which it is connected via an avionics network of the aircraft and/or via a direct link, while operating a customized transmission of these aircraft state(s), a consumer avionics device receiving only the aircraft state(s) it requires.

According to other advantageous aspects of the invention, the electronic device for the centralized computation and diffusion of the state(s) of an aircraft comprises one or more of the following characteristics, taken alone or in any technically possible combination:
  the electronic device for the centralized computation and diffusion is capable of diffusing the list of aircraft states:
    during an initialization phase of the electronic device for the centralized computation and diffusion, and/or
    during an initialization phase of at least one consumer avionics device connected to the electronic device for the centralized computation and diffusion via the avionics network and/or via a direct link, and/or on request from at least one consumer avionics device connected to the electronic device for the centralized computation and diffusion via the avionics network and/or via a direct link, and/or via a configuration file accessible by each consumer avionics device, and/or in the event of a change in the value of at least one state in the said list of states, and/or periodically;

the list is configurable in a number of aircraft state(s), and/or in type of aircraft state(s) and/or in information showing the said aircraft state;

the list includes, for each aircraft state:

a predetermined invariant label of the said aircraft state, the label being known to each consumer avionics device capable of consuming the said state, and/or an identifier of the said aircraft state, variable from a current configuration to a next configuration in the list;

the electronic device for the centralized computation and diffusion is configured to transmit to the said at least one consumer avionics device, only the value or values of the said at least one selected aircraft state, periodically and/or in the event of a change in the value or values of the said at least one selected aircraft state.

The invention also relates to an electronic assembly comprising at least two pieces of electronic equipment linked together by an avionics network and/or by a direct link, in which at least one of the at least two pieces of electronic equipment comprises an electronic device for the centralized computation and diffusion of the aforementioned type, and in which at least one of the at least two pieces of electronic equipment comprises at least one avionics device consuming at least one value of at least one state of the said aircraft, the electronic device for the centralized computation and diffusion and the said at least one consumer avionics device communicating with each other by means of a communication protocol according wherein:

the electronic device for the central computation and diffusion uses a publication pattern for:

diffusing the list of aircraft states the value of which is suitable to be accessible via the electronic device for the centralized computation and diffusion, and transmit, to the at least one consumer avionics device, only the value or values of the said at least one selected aircraft state, and the said at least one consumer avionics device uses a subscription pattern to request the electronic device for the centralized computation and diffusion to transmit one or more values of at least a first aircraft state selected from the list.

The invention also relates to a method for the central computation and diffusion of aircraft state(s), the method for the central computation and diffusion being implemented by an electronic device for the centralized computation and diffusion of the state(s) of an aircraft, the method for central computation and diffusion of aircraft states comprising the following steps:

the computation of the value of one or more distinct aircraft state(s), the generation of a list of aircraft state(s) whose value is suitable to be accessible via the electronic device for the centralized computation and diffusion, the list comprising, for each aircraft state, at least one item of information representative of the said aircraft state, diffusion of the list to each consumer avionics device of at least one value of at least one state of the said aircraft, a consumer avionics device being connected to the electronic device for the centralized computation and diffusion via an avionics network and/or via a direct link, the reception of at least one request for transmission of one or more values of at least one first aircraft state selected from the list, the request being sent by at least one consumer avionics device connected to the electronic device for the centralized computation and diffusion via the avionics network and/or via a direct link, the request comprising the said at least one representative item of information related to the said at least one first selected aircraft state, the transmission to the said at least one consumer avionics device of only the value or values of the said at least one first selected aircraft state.

Depending on other advantageous aspects of the invention, the method for the centralized computation and diffusion of the state(s) of an aircraft includes one or more of the following characteristics, taken alone or in all technically possible combinations:

in the event of receipt of a request for transmission of one or more values of at least one second aircraft state selected from the list, the request being issued by the said at least one consumer avionics device, the said at least one second aircraft state selected from the list being distinct from the said at least one first aircraft state selected from the list, the transmission, to the said at least one consumer avionics device, of only the value or values of the said at least one first selected aircraft state is automatically interrupted and replaced by the transmission to the said at least one consumer avionics device, of only the value or values of the said at least one second selected aircraft state;

in the event of reception of at least two requests for transmission of the value or values of the same first aircraft state, the said at least two requests being transmitted respectively by at least two distinct consumer avionics devices, the transmission comprises a mutualization of the transport of the value or values of the same first aircraft state to the said at least two distinct consumer avionics devices.

The object of the invention also is a computer program comprising software instructions which, when executed by a computer, implement a method for the centralized computation and diffusion of the state(s) of an aircraft as defined above.

These features and advantages of the invention will become clearer on reading the following description, given only as a non-limiting example and by reference to the annexed drawings, on which:

Figure 1:
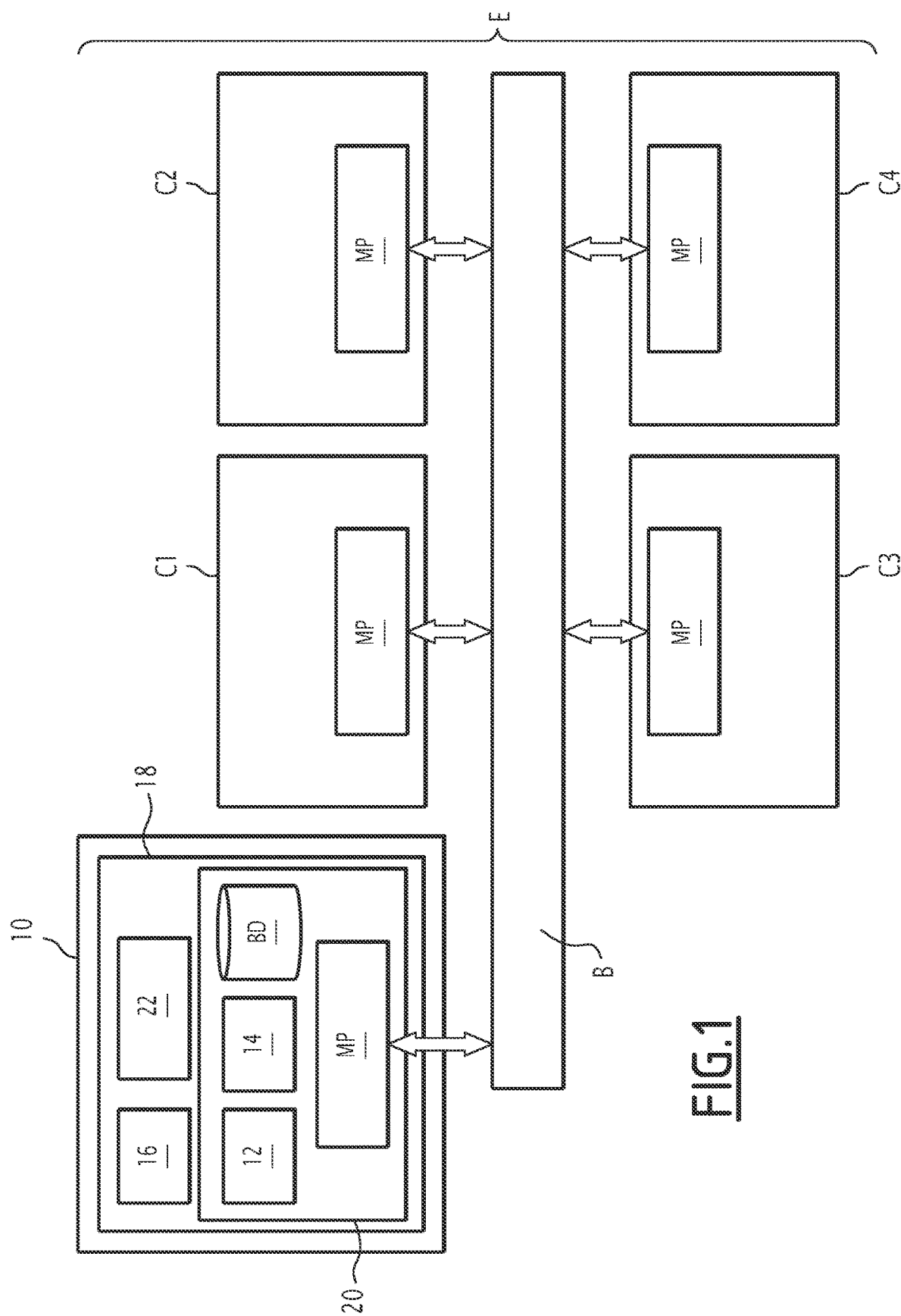
FIGS. 1 to 3 are schematic representations of three variants of the electronic assembly architecture according to the invention.

In FIG. 1, a first example of the architecture of an electronic assembly E according to the present invention is shown. According to this first example, such an electronic assembly E comprises at least two pieces of electronic equipment, namely here five pieces of electronic equipment 10, C1, C2, C3 and C4 linked together by an avionics network, in particular via an avionics bus B, in particular of type AFDX (Avionics Full DupleX switched ethernet) for example ARINC 664, ARINC 429, etc.

More precisely, the electronics assembly E includes, among the five pieces of electronic equipment 10, C1, C2, C3 and C4, an electronic device 10 for the centralized computation and diffusion of the state(s) of an aircraft, and four avionics consumer devices C1, C2, C3 and C4, each capable of consuming at least one aircraft state in real time. The consumer avionics device C1 is, for example, a Flight Warning System (FWS). The consumer avionics device C2 is for example a system or a set of synoptic systems capable of displaying synoptic diagrams/pages of avionics equipment to show for example the avionics equipment dedicated to fuel, electrical and hydraulic distribution or the capabilities of the aircraft in terms of trajectories, approaches, etc. The consumer avionics device C3 is for example a Flight Management System (FMS). The consumer avionics device C4 is for example a maintenance system (or a set of systems) capable of configuring an on-board diagnostic avionics system according to the failure(s) detected, in particular from one or more aircraft states. Each of the four consumer avionics devices C1, C2, C3 and C4 includes at least one transmitter/receiver not shown.

The electronic device 10 for the centralized computation and diffusion of the state(s) of an aircraft according to the present invention is configured for at least:
  calculating the value of one or more distinct aircraft state(s),
  generate a list of aircraft state(s) whose value is suitable to be accessible via the electronic device for the centralized computation and diffusion, the list comprising, for each aircraft state, at least one item of information representative of the said aircraft state,
  diffusion of the list to each consumer avionics device C1, C2, C3 and C4 of at least one value of at least one condition of the said aircraft,
  receive, from at least one consumer avionics device, at least one request for transmission of one or more values of at least one first aircraft state selected from the list, the request comprising the said at least one representative item of information related to the said at least one first selected aircraft state,
  transmit, to the said at least one consumer avionics device, only the value or values of the said at least one selected aircraft state.

The electronic device 10 for the centralized computation and diffusion of the state(s(of an aircraft shown in FIG. 1 is, according to a first variant an independent piece of electronic equipment, or according to a second variant, not shown, for example, integrated in an electronic I/O (Input/Output) device such as an IOM (Input/output Module) for data concentration and conversion (for example from an ARINC 429 to an ARINC 664 bus or for converting analog to digital data).

Such an electronic device 10 for the centralized computation and diffusion of the state(s) of an aircraft includes a module 12 for calculating the value of one or more distinct aircraft state(s). Such a computation module 12 is, according to a first variant not shown, obtained from a formal specification capable of generating automatic computation code, for example from the SCADE (Safety-Critical Application Development Environment) commercial environment or even the Simulink graphic modeling environment. According to a second variant illustrated in FIG. 1, such a computation module 12 includes a configurable logic engine interpreting a logic database, embedded/integrated directly within the electronic device 10 and/or coming from an external download. Whatever the variant, the computation module 12 is related to a tool chain, not shown, allowing to obtain the elements specific to the implemented variant, namely, respectively, the formal specification or the above-mentioned BD database.

In addition, the electronic device 10 for the centralized computation and diffusion of the state(s) of an aircraft comprises a module 14 for generating the list of aircraft state(s) (also called aircraft state dictionary), the value of which is accessible via the electronic device for the centralized computation and diffusion, the list comprising, for each aircraft state, at least one item of information that is representative of the said aircraft state.

Advantageously, according to the present invention, the list is configurable in terms of number of aircraft states, and/or in terms of type of aircraft state(s) and/or in terms of information showing the said aircraft state.

As an optional complement, the list includes, for each aircraft state:
  a predetermined invariant label of the said aircraft state, the label being known to each consumer avionics device capable of consuming the said state, and/or
  an identifier of the said aircraft state, variable from a current configuration to a next configuration in the list.

For example, for a current aircraft configuration, it is necessary to know for at least one of the four avionics consumer devices C1, C2, C3 and C4 the state of a first and a second fuel pump as well as the state of a first and a second hydraulic system pump. The invariant label of the state of the first fuel pump is for example FUEL_PMP1, the invariant label of the state of the second fuel pump is for example FUEL_PMP2, the invariant label of the state of the first hydraulic pump is for example HYD_PMP1, the invariant label of the state of the second hydraulic pump is for example HYD_PMP2.

When the computation module 12 is, according to a first variant not shown, obtained from a formal specification capable of generating an automatic computation code, each label is directly integrated, during a preliminary configuration phase, into this computation code, and when according to a second variant illustrated in FIG. 1, the computation module 12 includes a configurable logic engine interpreting a logic database, such a label is integrated, during a preliminary configuration phase, within the logic database BD. Each label integrated within the computation module 12 is extracted by module 14 to generate the list of aircraft state(s).

The C1 consumer avionics device, for example, needing to know in real time these four distinct states of the first and second fuel pumps and of the first and second hydraulic pumps, is configured beforehand to know the invariant labels related to each of these states.

According to a preferential variant allowing in particular to accelerate, secure and optimize software processing, the module 14 for generating the list of aircraft state(s) is configured to associate within the list each invariant label of a state with an identifier that it assigns to this same state, the identifier being variable from a current configuration to a subsequent configuration of the list.

For example, the module 14 for generating the list of state(s) associates:
  the identifier 1001 to the label FUEL_PMP1 of the first fuel pump,
  the identifier 1002 to the label FUEL_PMP2 of the second fuel pump, the identifier 2001 to the HYD_PMP1 label of the first hydraulic pump, the identifier 2002 to the HYD_PMP2 label of the second hydraulic pump.

The resulting list then corresponds for example to the following list L of unique pairs of information showing aircraft states:

L={[FUEL_PMP1; 1001]; [FUEL_PMP2; 1002]; [HYD_PMP1; 2001]; [HYD_PMP2; 2002]}.

According to another variant, the identifier corresponds only to the position of the label in the list L, for example if L={FUEL_PMP1; FUEL_PMP2; HYD_PMP1; HYD_PMP2}, the identifier of the state of the second fuel pump is number 2, while that of the second hydraulic pump is number 4.

According to yet another variant, the invariant wording is sufficient and no related identifier is required according to the present invention.

Once the list has been generated according to a current configuration, the electronic device 10 for the centralized computation and diffusion of the state(s) of an aircraft is capable of diffusing the list to each consumer avionics device C1, C2, C3 and C4, and for this purpose comprises a transmitter/receiver module 16.

Within the electronic assembly E, the electronic device 10 for the centralized computation and diffusion of the state(s) of an aircraft and each consumer avionics device C1, C2, C3 and C4 communicate with each other using a predetermined communication protocol applied by a protocol module MP formatted according to this protocol. For example, it is a Publish-Subscribe protocol as described in patents FR 3 073 966 and FR 3 074 007 on behalf of the Applicant.

More specifically, the electronic device 10 for the centralized computation and diffusion of the state(s) of an aircraft uses a publication pattern, generated by the protocol module PM, to diffuse, by means of the transmitter/receiver module 16, the list L of aircraft state(s), the value of which is able of being accessed via the electronic device 10 for the centralized computation and diffusion.

According to an optional complementary aspect, the protocol module MP is capable of splitting, into data packets, the information of the list L of the aircraft state(s) transmitted within the publication pattern, and/or adding a transport layer in order to secure the correct reception of the data by the various consumer avionics devices C1, C2, C3 and C4.

As an optional complement, the transmitter/receiver module 16 of the electronic device 10 for the centralized computation and diffusion of the state(s) of an aircraft is able to diffuse the aircraft state list(s):

during an initialization phase of the electronic device for the centralized computation and diffusion, and/or during an initialization phase of at least one consumer avionics device connected to the electronic device for the centralized computing and diffusion via the avionics network and/or via a direct link, and/or on request from at least one consumer avionics device connected to the electronic device for the centralized computation and diffusion via the avionics network and/or via a direct link, and/or via a configuration file accessible by each consumer avionics device, and/or in the event of a change in the value of at least one state in the said list of states, and/or periodically.

For example, when, according to a first variant, each consumer avionics device is capable of requesting the list of aircraft states, it is not necessary for the electronic device 10 for the centralized computation and diffusion of the state(s) of an aircraft state(s), producer (i.e., generator) of the list, to diffuse the said list at the time of its initialization.

According to a second variant, when at least one or all of the consumer avionics devices is unable to request the list of aircraft state(s), the list is then available in a configuration file accessible by the consumer avionics device(s) unable to request it, and/or diffused to the initialization of the electronic device 10 for the centralized computation and diffusion of the state(s) of an aircraft having produced it. The diffusion to the initialization of the electronic device 10 for the centralized computation and diffusion of the state(s) of an aircraft makes it possible in particular to take advantage of a transitory phase of the aircraft during wherein it is acceptable from an operational point of view to exchange a large volume of data and to devote a significant part of the material resources to their processing but supposes that the consumer avionics device(s) C1 to C4 are ready to receive the said list, which can be verified by the electronic device 10 for the centralized computation and diffusion of the state(s) of an aircraft by monitoring the value of a life bit, emitted by each avionics consumer device C1 to C4, (or conversely emitted by the electronic device 10 for the centralized computation and diffusion of the state(s) of an aircraft and monitored by the consumer avionics device(s)). Where the life bit value of a consumer avionics device indicates that the consumer avionics device is not ready to receive the list, a reset of the electronic device 10 for the centralized computing and diffusion of the state(s) of the aircraft is implemented to diffuse the aircraft state list(s) as soon as the life bit value is changed to indicate that the consumer avionics device is available to receive the said aircraft state list(s).

According to a third and a fourth variant respectively, the aircraft state list(s) is diffused by the transmitter/receiver module 16 of the electronic device 10 for the centralized computation and diffusion of the state(s) of an aircraft respectively in the event of a change in value of at least one state of said state list(s) or periodically.

Each C1, C2, C3 or C4 consumer avionics device receiving the list of aircraft state(s), is capable, when an identifier is related to a state label within the list, of extracting the identifiers from the aircraft states that they require.

In other words, after publication of the list L={[FUEL_PMP1; 1001]; [FUEL_PMP2; 1002]; [HYD_PMP1; 2001]; [HYD_PMP2; 2002]} by the transmitter/receiver module 16 of the electronic device 10 for the centralized computation and diffusion of the state(s) of an aircraft, the consumer avionics device C1, for example, which requires the value of these four states in order to operate, stores in an unshown memory the identifiers that the electronic device 10 for the centralized computation and diffusion of the state(s) of an aircraft has related to them in the current configuration. More precisely, the consumer avionics device C1, which previously only knew the labels FUEL_PMP1; FUEL_PMP2; HYD_PMP1; HYD_PMP2, associates the identifiers 1001, 1002, 2001 and 2002 with them respectively.

Alternatively, if the list L is such that L={FUEL_PMP1; FUEL_PMP2; HYD_PMP1; HYD_PMP2}, the consumer avionics device C1 which previously only knew the labels FUEL_PMP1; FUEL_PMP2; HYD_PMP1; HYD_PMP2 respectively associates them the identifiers 1, 2, 3 and 4 corresponding to their position in the list.

In the same way if the list L is such that L={HYD_PMP1; HYD_PMP2; FUEL_PMP1; FUEL_PMP2}, the consumer avionics device C1 which previously only knew the labels FUEL_PMP1; FUEL_PMP2; HYD_PMP1; HYD_PMP2 respectively associates them with the identifiers 3, 4, 1 and 2 corresponding to their position in the list.

On receipt of list L by each consumer avionics device C1, C2, C3 or C4, an operational mode of the electronic assembly E is activated (i.e., the electronic device for the centralized computation and diffusion of the state(s) of an aircraft and the consumer avionics devices C1, C2, C3 or C4 are capable of switching to the operational mode).

In the operational mode, the computation module 12 of the value of one or more distinct aircraft state(s) continuously calculates the state of different avionics equipment (e.g., engines, actuators, hydraulic systems) or aircraft capabilities (e.g., possible types of approach, phase of flight,) using a logic processing tool that is not shown.

The transmitter/receiver module 16 of the electronic device 10 for the centralized computation and diffusion of the state(s) of an aircraft is then configured to receive from at least one consumer avionics device C1, C2, C3 or C4, at least one request for transmission of one or more values of at least one first aircraft state selected from the list, the request comprising the said at least one representative piece of information related to the said at least one first selected aircraft state.

As an optional complement, the said at least one consumer avionics device C1, C2, C3 or C4, uses a subscription pattern (i.e., subscription), generated by its own protocol module PM, to request from the electronic device 10 for the centralized computation and diffusion of the state(s) of an aircraft the transmission of one or more values of at least one first aircraft state selected from the list. The protocol module MP of the electronic device 10 for the centralized computation and diffusion.

Specifically, the consumer avionics device C1, for example, requires the value of the state of the first and second fuel pumps and the state of the first and second hydraulic pumps to operate and requires, using in particular, a subscription pattern, the transmission of their value periodically and/or in the event of a change in value, the subscription pattern including a representative information related to the said at least one first selected aircraft state.

According to a first variant, the representative information inserted in the subscription request corresponds to the identifier related to the invariant label in the list L={[FUEL_PMP1; 1001]; [FUEL_PMP2; 1002]; [HYD_PMP1; 2001]; [HYD_PMP2; 2002]}, for example, the identifier 1001 to signify to the electronic device 10 for the centralized computation and diffusion of the state(s) of an aircraft that the consumer avionics device C1 wishes to subscribe to the status value of the first fuel pump.

According to a second variant, the representative information inserted in the subscription request corresponds to the identifier related to the invariant label in the list L={FUEL_PMP1; FUEL_PMP2; HYD_PMP1; HYD_PMP2}, for example, the identifier 1 of position in the list to signify to the electronic device 10 for the centralized computation and diffusion of the state(s) of an aircraft that the consumer avionics device C1 wishes to subscribe to the status value of the first fuel pump.

According to a third variant, the representative information inserted in the subscription request corresponds to the identifier related to the invariant label in the list L={HYD_PMP1; HYD_PMP2; FUEL_PMP1; FUEL_PMP2}, for example, the identifier 3 of the position in the list to signify to the electronic device 10 for the centralized computation and diffusion of the state(s) of an aircraft that the consumer avionics device C1 wishes to subscribe to the status value of the first fuel pump.

According to a fourth variant that does not require an identifier, the representative information inserted in the subscription request corresponds directly to the invariant label FUEL_PMP1 of the first fuel pump.

Thus, according to the present invention, depending on their needs, the various consumer avionics devices C1, C2, C3 and C4 subscribe to the state of the avionics equipment(s) or the state of the aircraft's capabilities that interest them at a current moment. For example, the consumer avionics device C2 corresponding to a system or set of synoptic systems capable of displaying synoptic diagrams/pages of avionics equipment(s), when it presents a page related to the fuel system, subscribes to all data related to the status of the fuel systems, and when it presents a page related to the hydraulic system, unsubscribes from the data of the fuel system and subscribes to the data of the hydraulic system. According to a particular aspect, the unsubscription, for example of the fuel system status values, is automatic when subscribing to new states, for example those of the hydraulic system.

Such a customized subscription makes it possible both to limit the bandwidth consumed by adjusting the volume of data required to the strict need, and to limit the computing time required by processing only the data necessary for the function required at the current time.

The transmitter/receiver module 16 of an aircraft's electronic device 10 for the centralized computation and diffusion is further configured to transmit, to the said at least one consumer avionics device from which it has received the request, only the value or values of the said at least one selected aircraft state.

As an optional complement, according to the example in FIG. 1, the transmitter/receiver module 16 of the electronic device 10 for the centralized computation and diffusion of the state(s) of an aircraft also uses a publication pattern generated by the protocol module MP to transmit to the said at least one consumer avionics device only the value or values of the said at least one selected aircraft state.

Thus, the common protocol module MP (i.e., integrated respectively within) the electronic device 10 for the centralized computation and diffusion of aircraft state(s) and the consumer avionics devices C1, C2, C3 and C4 is capable of generating and processing two distinct communication patterns, namely a publication pattern and a subscription pattern.

As an optional complement, the transmitter/receiver module 16 of the electronic device 10 for the centralized computation and diffusion of the state(s) of an aircraft is configured to transmit to the said at least one consumer avionics device C1, C2, C3 or C4, only the value(s) of the said at least one selected aircraft state, periodically and/or in the event of a change in the value(s) of the said at least one selected aircraft state.

Advantageously, when one of the consumer avionics devices C1, C2, C3 or C4 requires a state value absent from the list L of aircraft state(s) of the current configuration, according to an optional complementary aspect of the present invention, the electronic device 10 for the centralized computation and diffusion of the state(s) of an aircraft), and/or the consumer avionics device concerned by such a need, is or are respectively reconfigurable. In particular, the computation module 12 (in particular by modification of the formal specification or of the logic database BD from which it is derived) and the list generation module 14 of the electronic device 10 for the centralized computation and diffusion of the state(s) of an aircraft are reconfigurable to calculate and modify the list L of aircraft state(s) in order to integrate an additional state in a subsequent configuration, for example, with the invariant label HYD_PMP3, the state of a third hydraulic pump required only by the consumer avionics device C1 and not by the consumer avionics devices C2, C3 or C4.

Compared to the current configuration CP where for example the aircraft state list $L_{CP}$ is such that $L_{CP}$={ [FUEL_PMP1; 1001]; [FUEL_PMP2; 1002]; [HYD_PMP1; 2001]; [HYD_PMP2; 2002]}, the $L_{CS}$ list modified for the following CS configuration is for example $L_{CS}$={[FUEL_PMP1; 6001]; [FUEL_PMP2; 6002]; [HYD_PMP1; 7001]; [HYD_PMP2; 7002]; [HYD_PMP3; 7003]}.

Consistently, the consumer avionics device C1 is reconfigured to know beforehand the invariant wording HYD_PMP3 allocated to the state of the third hydraulic pump.

The other consumer avionics devices C2, C3 or C4 that do not use the new HYD_PMP3 data are not concerned by this reconfiguration, and according to the implementation variants using an identifier related to a label, only the electronic device for the centralized computation and diffusion of the state(s) of an aircraft is configured to generate the identifier respectively related to each invariant label, an identifier being capable of changing from a current configuration CP to a following configuration CS, for example 1001 for the label FUEL_PMP1 of the first fuel pump of the current configuration CP, and 6001 for this same label in the following configuration CS of the $L_{CS}$ list.

As indicated previously, after reconfiguration, the electronic device 10 for the centralized computation and diffusion of the state(s) of an aircraft diffuses the new $L_{CS}$ list, such that for example $L_{CS}$={[FUEL_PMP1; 6001]; [FUEL_PMP2; 6002]; [HYD_PMP1; 7001]; [HYD_PMP2; 7002]; [HYD_PMP3; 7003]} where the identifiers are completely different from the previous configuration without impacting the consumer avionics devices configured to reassociate these new identifiers with the invariant labels [Functional Identification, Identifier] associations during their initialization, and to subscribe to the aircraft states they are interested in.

Only the consumer avionics device C1 impacted (i.e., needed for its operation) by the added state, for example the state of the third hydraulic pump, will subscribe to it. Unmodified C2, C3 or C4 consumer avionics devices are able to receive their state values as in the previous configuration and are not impacted by changes made to the electronic device 10 for the centralized computation and diffusion of the state(s) of an aircraft.

In the example in FIG. 1, the electronic device 10 for the centralized computation and diffusion of the state(s) of an aircraft comprises an information processing unit 18, formed for example by a memory 20 associated with a processor 22 such as a CPU (Central Processing Unit).

In the example in FIG. 1, the module 12 for calculating the value of one or more distinct aircraft states and the module 14 for generating the list L of aircraft states are each in the form of software executable by the processor 22.

The memory 20 of the data processing unit 18 is then able to store computation software configured to calculate the value of one or more distinct aircraft states, and generation software configured to generate the list of aircraft states.

The processor 22 is then able to execute the computation software and the generation software of the list L of aircraft state(s).

As an alternative not shown, the module 12 for calculating the value of one or more distinct aircraft states and the module 14 for generating the list L of aircraft states are each implemented in the form of a programmable logic component, such as an FPGA (Field Programmable Gate Array), or in the form of a dedicated integrated circuit, such as an ASIC (Application Specific Integrated Circuit).

When at least one part of the electronic device 10 for the centralized computation and diffusion of the state(s) of an aircraft is in the form of one or more software programs, i.e., a computer program, it is also able to be recorded on a medium, not shown, that is readable by a computer. The computer-readable medium is, for example, a medium capable of storing electronic instructions and of being coupled to a bus of a computer system. For example, the readable medium is an optical disk, magneto-optical disk, ROM, RAM, any type of non-volatile memory (e.g. EPROM, EEPROM, FLASH, NVRAM), magnetic card or optical card. On the readable medium is then stored a computer program containing software instructions.

In the same way, each consumer avionics device is capable of containing an information processing unit, for example a memory related to a processor, which is not shown.

The electronic device 10 for the centralized computation and diffusion of the state(s) of an aircraft is preferably intended to be carried on board the aircraft. As an alternative, an aircraft's electronic device 10 for the centralized computation and diffusion of the state of the aircraft is "disembarked" and remote from the aircraft with which it communicates remotely via a wireless link.

Figure 2:
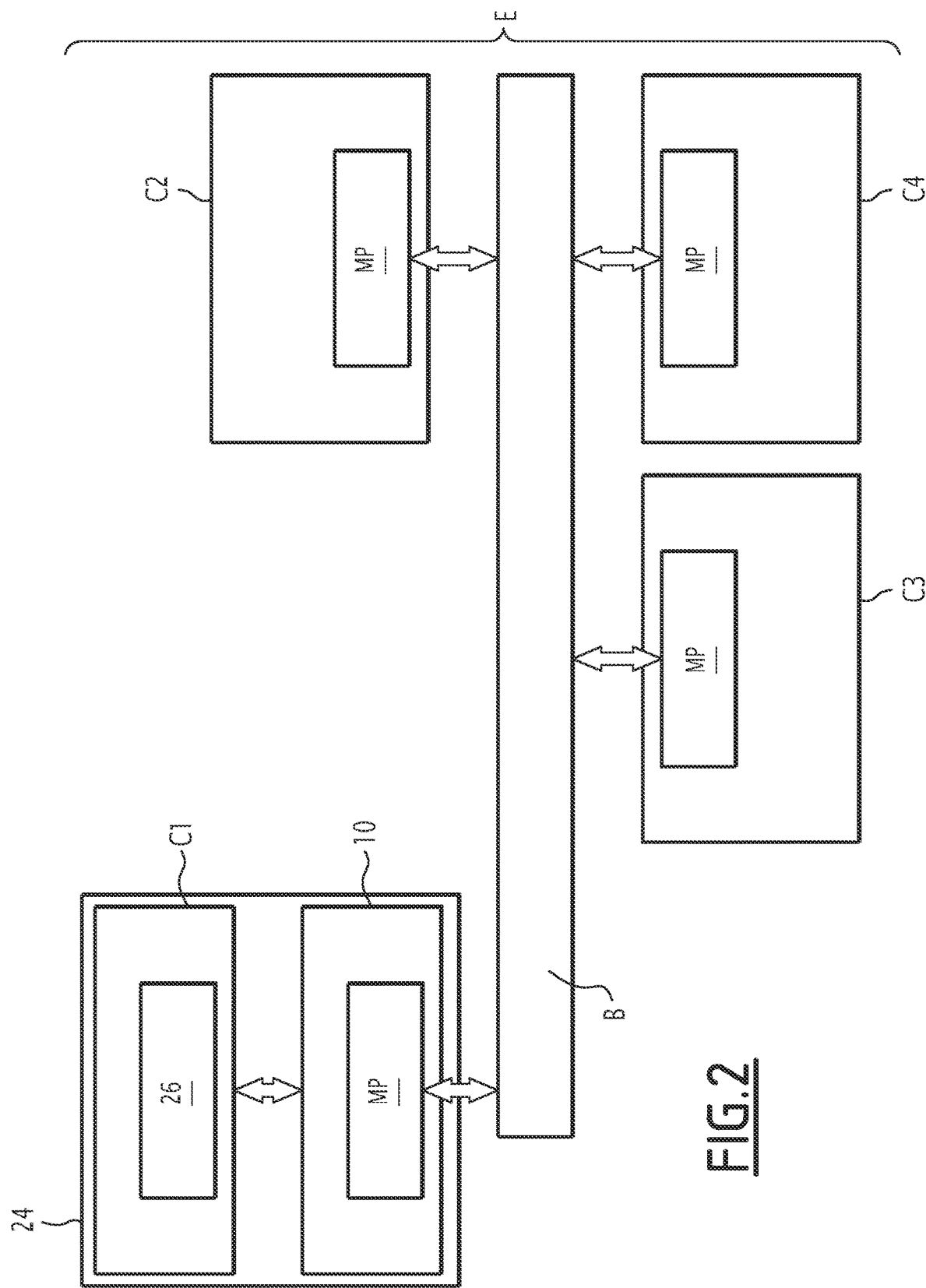

The FIG. 2 shows another variant of the architecture of the electronic assembly E according to the invention compared to that illustrated in FIG. 1. According to this second variant, the electronic device 10 for the centralized computation and diffusion of the state(s) of a previously described aircraft is integrated into an electronic equipment 24 also comprising one of the consumer avionics devices such as, for example, the consumer avionics device C1 corresponding to a flight warning system or FWS (Flight Warning System), or the consumer avionics device C2 corresponding to a system or a set of synoptic systems.

In other words, according to this variant, the electronic device 10 for the centralized computation and diffusion of the state(s) of an aircraft and a consumer avionics device, for example C1, are co-located within the same avionics equipment 24 whose protocol module MP is then shared. In this case, the electronic device 10 for the centralized computation and diffusion of the state(s) of an aircraft communicates directly, via a direct internal link to the avionics equipment 24, with the functional module 26 of the consumer avionics device C1, which is capable of implementing the flight warning system. The electronic equipment 24 communicates with the other consumer avionics devices C2, C3 and C4 via an avionics bus B, in particular ARINC 664, ARINC 429, etc.

Figure 3:
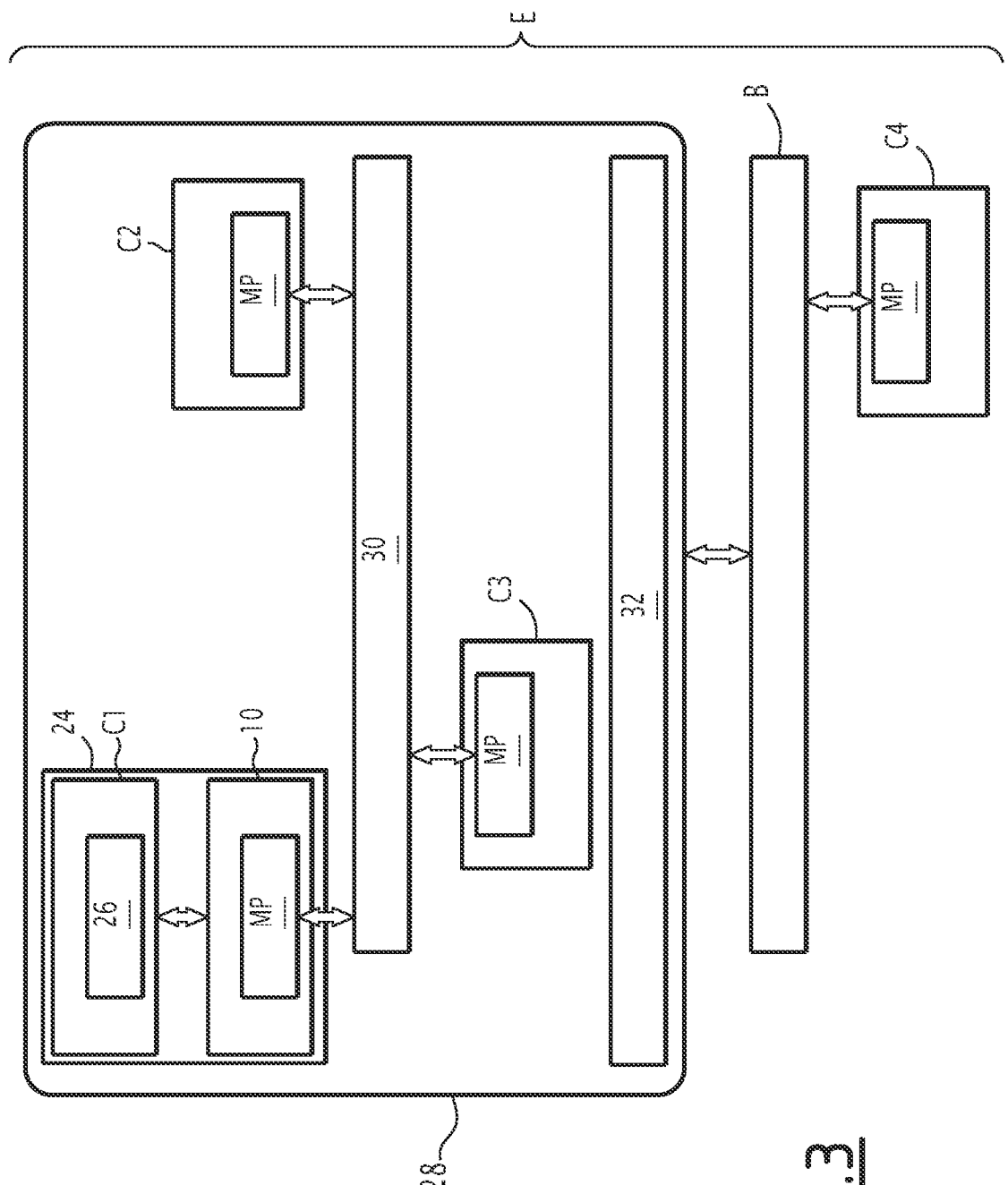

The FIG. 3 shows yet another variant of the architecture of the electronic assembly E according to the invention compared to the one illustrated in FIGS. 1 and 2. According to this third variant, as in the second variant, the electronic device 10 for the centralized computation and diffusion of the state(s) of an aircraft and a consumer avionics device, for example C1, are co-located within the same piece of avionics equipment 24. The avionics equipment 24 and consumer avionics devices C2, C3 within the same electronics unit 28, for example an avionics supercomputer, wherein the consumer avionics device C4 is outside (i.e., outside the housing of the electronic entity 28). Within the electronics unit 28, the avionics equipment 24 and the consumer avionics devices C2, C3, communicate via an internal RAM 30 port, and the electronics unit 28 also includes an interface manager 32 to communicate with the external consumer avionics device C4, by managing physical access to the avionics bus B, in particular ARINC 664, ARINC 429, etc.

Figure 4:
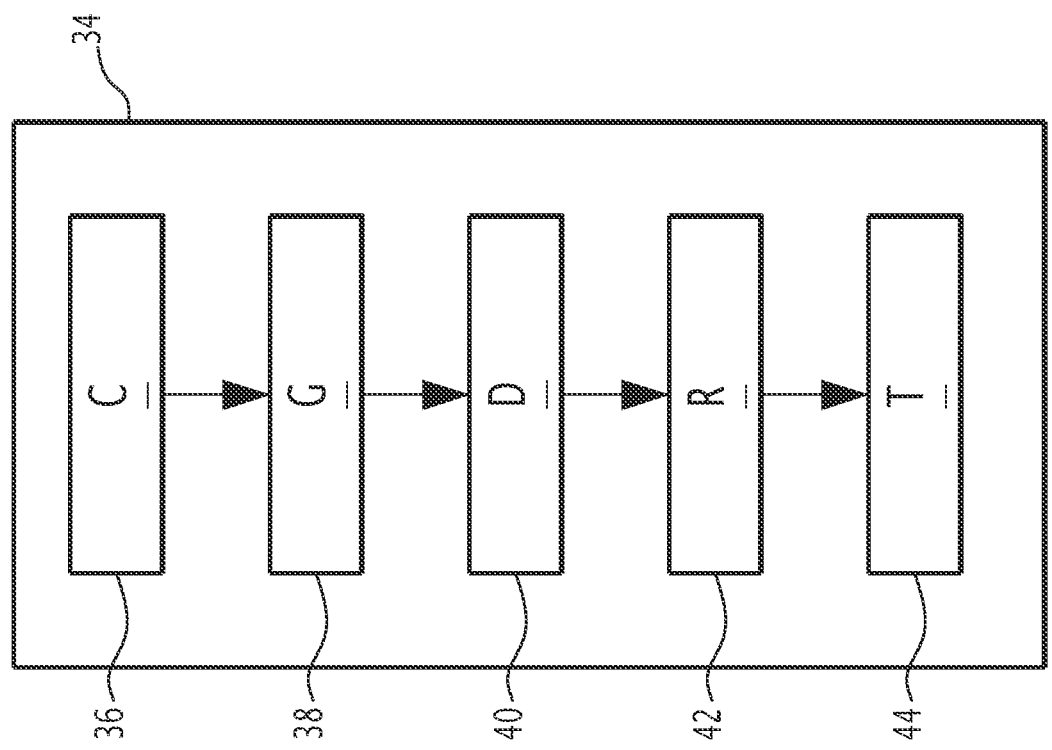
FIG. 4 is a flowchart of a method for the centralized computation and diffusion of the state(s) of an aircraft according to the invention.

The operation of an aircraft's electronic device 10 for the centralized computation and diffusion of the state(s) of an aircraft will now be explained using FIG. 4 showing a flowchart of a method 34 for the centralized computation and diffusion of the state(s) of an aircraft.

During a step 36, the computation module 12 of the electronic device 10 calculates C the value of one or more distinct aircraft state(s). During step 38, the generation module 14 of electronic device 10 generates G a list of aircraft state(s) the value of which is accessible via the electronic device for the centralized computation and diffusion, the list comprising, for each aircraft state(s), at least one item of information representative of the said aircraft state.

According to the example in FIG. 4, the computation step 36 and generation step 38 follow one another. Alternatively, these two steps are implemented in parallel, or even computation step 36 follows generation step 38. In addition, the computation step 36 is a permanent computation step as long as the current computation configuration is pending.

Once the list of aircraft state(s) has been generated, in a step 40, the transmitter/receiver module 16 of the electronic device 10 for the centralized computation and diffusion the state(s) of an aircraft diffuses D, the list to each consumer avionics device of at least one value of at least one state of the said aircraft, a consumer avionics device being connected to the electronic device for the centralized computation and diffusion via an avionics network and/or via a direct link.

Then, during a step 42, the transmission/reception module 16 of the electronic device 10 for the centralized computation and diffusion of the state(s) of an aircraft receives R, at least one request for the transmission of one or more values of at least one first aircraft state selected from the list, the request being transmitted by at least one consumer avionics device connected to the electronic device for the centralized computation and diffusion via the avionics network and/or via a direct link, the request comprising the said at least one representative information related to the said at least one first selected aircraft state.

According to an optional complementary aspect, in the event of receiving a request for transmission of one or more values of at least one second aircraft state selected from the list, the request being issued by the said at least one consumer avionics device, the said at least one second aircraft state selected from the list being distinct from the said at least one first aircraft state selected from the list, the transmission of the said at least one consumer avionics device, of only the value or values of the said at least one first selected aircraft state is automatically interrupted and replaced by the transmission to the said at least one consumer avionics device, of only the value or values of the said at least one second selected aircraft state.

In other words, such a request to subscribe to the value or values of said at least one second selected aircraft state is tantamount to automatically unsubscribing from the value or values of the said at least one first selected aircraft state.

In a step 44, the transmitter/receiver module 16 of the electronic device for the centralized computation and diffusion of the state(s) of an aircraft, transmits T, to the said at least one consumer avionics device, only the value or values of the said at least one first selected aircraft state.

According to an optional complementary aspect, in the event of reception R 42 of at least two requests for transmission of the value or values of the same first aircraft state, the said at least two requests being issued respectively by at least two distinct consumer avionics devices, the transmission T 44 comprises a mutualization of the transport of the value or values of the same first aircraft state to the destination of the said at least two distinct consumer avionics devices. In other words, the values of the same state(s) required by the distinct consumers are mutualized at the transport layer level, to optimize the bandwidth.

Figure 5:
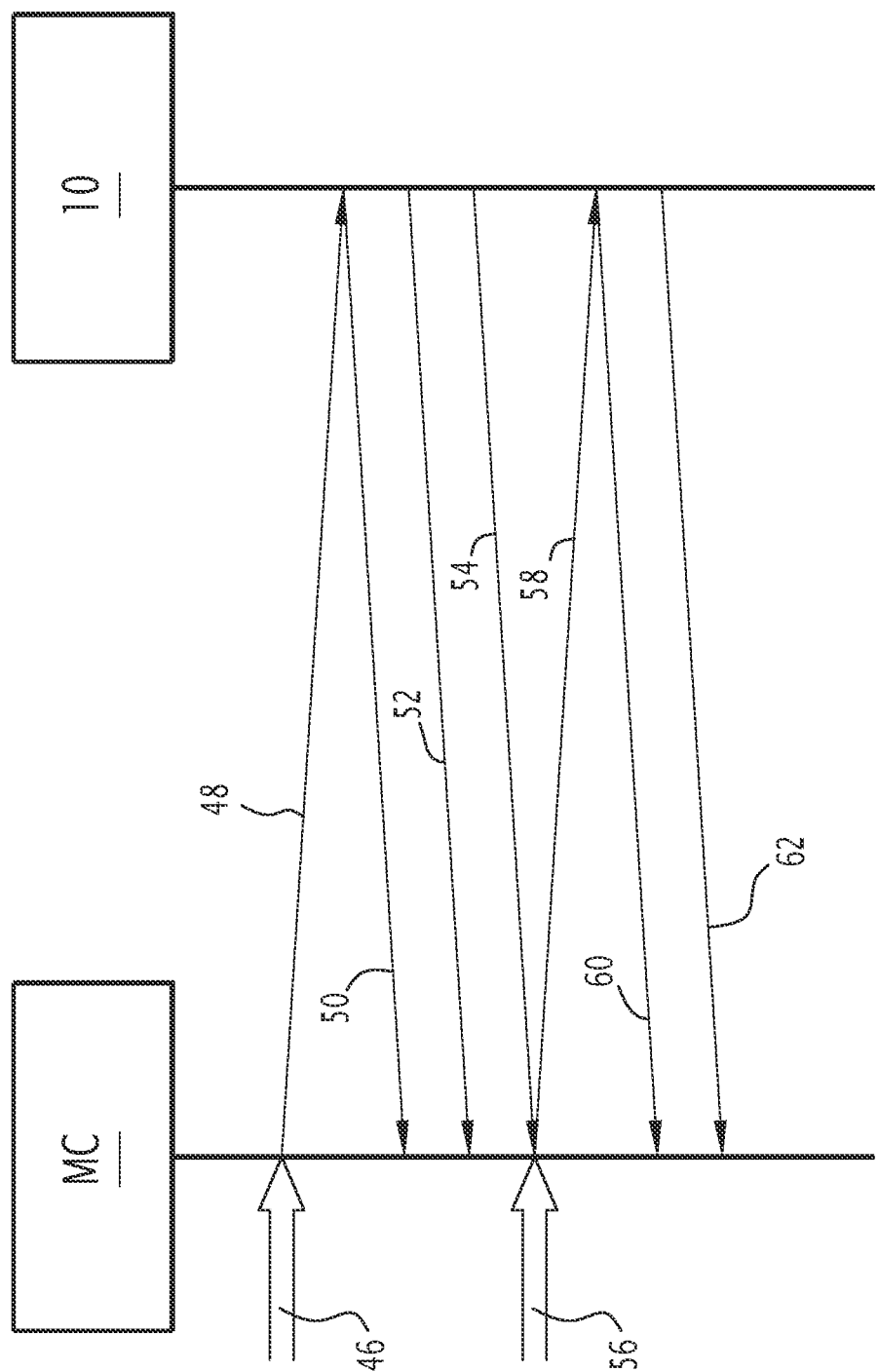
FIG. 5 is a chronogram of exchanges between an electronic device for the centralized computation and diffusion of the state(s) of an aircraft and a consumer avionics device.

FIG. 5 shows an example of exchanges, after the diffusion of the aircraft state list L={[FUEL_PMP1; 1001]; [FUEL_PMP2; 1002]; [HYD_PMP1; 2001]; [HYD_PMP2; 2002]}, between a consumer avionics device MC and an electronic device 10 for the centralized computation and diffusion of the state(s) of an aircraft. The consumer avionics device MC corresponds, for example, to a system C2 or a set of synoptic systems capable of displaying synoptic diagrams/pages of avionics equipment(s) to show, for example, the avionics equipment dedicated to fuel, electrical and hydraulic distribution or the capacity of the aircraft in terms of trajectories, approaches, etc.

The consumer avionics device MC displays (arrow 46) the page related to the fuel system and requests (arrow 48) from the electronic device 10 for a subscription to the values of the state of the first fuel pump with the label FUEL_PMP1 and the second fuel pump with the label FUEL_PMP2 by transmitting within this request the identifiers {[1001]; [1002]} previously published in the list L and related respectively to the labels FUEL_PMP1 and FUEL_PMP2.

The electronic device 10 indicates (arrow 50) its agreement to this subscription by transmitting for example the message {OK [1001]; OK [1002]} then publishes (arrow 52) the current values of the state of the fuel pumps for example with the message {[1001] NO; [1002] NO} where NO means that the current operation of these two fuel pumps is normal (Normal Operation).

At a time, later than the first publication 52, the electronics device 10 publishes (arrow 54) the new values of the states related, for example, with the message {[1001] NO; [1002] F} where F indicates a failure or abnormal operation of the second fuel pump.

Then, the consumer avionics device MC proceeds to display (arrow 56) the page related to the hydraulic system and then subscribes (arrow 58) via a new request to the values of the state of the first hydraulic pump labelled HYD_PMP1 and the second hydraulic pump labelled HYD_PMP2 by transmitting within this request the identifiers {[2001]; [2002]} previously published in the list L and related respectively to the labels HYD_PMP1 and HYD_PMP2. Such a subscription (i.e. subscription) to the values of the state of the hydraulic pumps is equivalent to unsubscription to the values of state of the fuel pumps, and the electronic device 10 indicates (arrow 60) its agreement to this subscription by transmitting for example the message {OK [2001]; OK [2002]} then publishes (arrow 62) the current values of the state of the hydraulic pumps for example with the message {[2001] NO; [2002] NO} where NO means that the current operation of these two hydraulic pumps is normal (Normal Operation).

It is thus conceived that the electronic device 10, the electronic assembly E and the computation and diffusion method according to the invention make it possible to optimize the interconnection between different avionics devices by sharing a single and consolidated vision of the situation of the aircraft in order to effectively assist the aircraft operator in his decision making, while customizing the transmission of the aircraft state(s) required by a consumer electronic device so as to limit the bandwidth consumed by adjusting the amount of data required to the strict need and limit the computing time required by processing only the data necessary for the function required at the current time.

The invention claimed is:

1. An electronic assembly comprising at least two pieces of electronic equipment connected together by an avionics network or by a direct link, wherein at least one of the at least two pieces of electronic equipment comprises an electronic device for the centralized computation and diffusion of the state(s) of an aircraft, and at least one of the at least two pieces of electronic equipment comprises at least one consumer avionics device of at least one value of at least one state of the said aircraft, the electronic device for the centralized computation and diffusion being configured to at least:
calculate the value of one or more distinct aircraft state(s), wherein the electronic device for the centralized computation and diffusion of the state(s) of an aircraft is further configured to:
generate a list of aircraft state(s) whose value is suitable to be accessible via the electronic device for the centralized computation and diffusion, the list comprising, for each aircraft state(s), at least one representative item of information of the said aircraft state,
diffuse the list to each consumer avionics device of at least one value of at least one state of the said aircraft,
receive, from at least one consumer avionics device, at least one request for transmission of one or more values of at least one first aircraft state selected from the list, the request comprising the said at least one representative item of information related to the said at least one first selected aircraft state, and
transmit, to the said at least one consumer avionics device, only the value or values of the said at least one selected aircraft state.

2. The electronic assembly according to the claim 1, wherein the electronic device for the centralized computation and diffusion is suitable for the diffusion of the list of aircraft state(s):
during an initialization phase of the electronic device for the centralized computation and diffusion, or
during an initialization phase of at least one of said consumer avionics devices connected to the electronic device for the centralized computation and diffusion via the avionics network or via a direct link, or
on request of at least one of said consumer avionics devices connected to the electronic device for the centralized computation and diffusion via the avionics network or via a direct link, or
via a configuration file accessible by each consumer avionics device, or
in the event of a change in the value of at least one state in the said list of states, or
periodically.

3. The electronic assembly according to the claim 1, wherein the list is configurable in number of aircraft state(s), or in type of aircraft state(s) or in information(s) showing the said aircraft state.

4. The electronic assembly according to claim 3, wherein the list comprises, for each aircraft state(s):
a predetermined invariant label of the said aircraft state, the label being known to each consumer avionics device capable of consuming the said state, or
an identifier of the said aircraft state, variable from a current configuration to a next configuration in the list.

5. The electronic assembly according to claim 1, wherein the electronic device for the centralized computation and diffusion is configured to transmit to the said at least one consumer avionics device, only the value or values of the said at least one selected aircraft state, periodically or in the event of a change in the value or values of the said at least one selected aircraft state.

6. The electronic assembly according to claim 1, the electronic device for the centralized computation and diffusion and the said at least one consumer avionics device communicating with each other by means of a communication protocol according wherein:
the electronic device for the centralized computation and diffusion uses a publication pattern for:
diffusing the list of aircraft state(s) the value of which is suitable to be accessible via the electronic device for the centralized computation and diffusion, and
transmit, to the said at least one consumer avionics device, only the value or values of the said at least one selected aircraft state, and
the said at least one consumer avionics device uses a subscription pattern to request from the electronic device for the centralized computation and diffusion the transmission of one or more values of at least a first aircraft state selected from the list.

7. A method for the centralized computation and diffusion of the state(s) of an aircraft, the method for the centralized computation and diffusion being implemented by an electronic device for the centralized computation and diffusion of the state(s) of an aircraft the method for the centralized computation and diffusion of the state(s) of an aircraft comprising:
the computation of the value of one or more distinct aircraft state(s),
wherein the method further comprises the following steps:
the generation of a list of aircraft state(s) the value of which is suitable for being accessible via the electronic device for the centralized computation and diffusion, the list comprising, for each aircraft state(s), at least one item of information representative of the said aircraft state,
the diffusion of the list to each consumer avionics device of at least one value of at least one state of the said aircraft, a consumer avionics device being connected to the electronic device for the centralized computation and diffusion via an avionics network or via a direct link,
the reception of at least one request for transmission of one or more values of at least one first aircraft state selected from the list, the request being sent by at least one consumer avionics device connected to the electronic device for the centralized computation and diffusion via the avionics network or via a direct link, the request comprising the said at least one representative item of information related to the said at least one first selected aircraft state,
the transmission, to the said at least one consumer avionics device, of only the value or values of the said at least one first selected aircraft state.

8. The method according to claim 7, wherein, upon receipt of a request to transmit one or more values of at least one second aircraft state selected from the list, the request being issued by the said at least one consumer avionics device, the said at least one second aircraft state selected from the list being distinct from said at least one first aircraft state selected from the list, the transmission, to the said at least one consumer avionics device, of only the value or values of the said at least one first selected aircraft state is automatically interrupted and replaced by the transmission, to the said at least one consumer avionics device, of only the value or values of the said at least one second selected aircraft state.

9. The method according to the claim 7, wherein in the event of reception of at least two requests for transmission of the value or values of a same first aircraft state, the said at least two requests being emitted respectively by at least two distinct consumer avionics devices, the transmission comprises a mutualization of the transport of the value or values of the same first aircraft state to the said at least two distinct consumer avionics devices.

10. A non-transitory computer readable medium comprising software instructions which, when executed by a computer, implement a method for the centralized computation and diffusion of the state(s) of an aircraft according to claim 7.

* * * * *